Inventor
Gregory C. Davison
By Brown, Boettcher & Clauser
Att'ys

Patented Oct. 14, 1924.

1,511,873

UNITED STATES PATENT OFFICE.

GREGORY C. DAVISON, OF NEW LONDON, CONNECTICUT.

TRACTION VEHICLE.

Application filed July 22, 1920. Serial No. 398,134.

*To all whom it may concern:*

Be it known that I, GREGORY C. DAVISON, a citizen of the United States, residing at New London, in the county of New London and State of Connecticut, have invented a certain new and useful Improvement in Traction Vehicles, of which the following is a full, clear, concise, and exact description, reference being had to the accompanying drawings, forming a part of this specification.

My invention relates to traction vehicles, and while more particularly concerned with tractors of the general type disclosed in my co-pending applications Serial Nos. 340,229 and 374,544, filed November 24th, 1919, and April 17th, 1920, respectively, certain features of the present invention are equally as applicable in connection with various other types of traction vehicles.

In the latter of the above applications I have provided a novel change speed mechanism including a pair of driven gears, a pair of co-operating driving pinions and means for shifting either of the driving pinions into and out of driving engagement with its co-operating driven gear. I have since found that this meshing and demeshing not only decreases the life of the change speed gearing, but that shifting of the intermediate shaft through which the drive is transmitted from the engine to the traction wheels of the vehicle is not under certain conditions desirable.

It is an object of the present invention to eliminate such disadvantages as the above and to that end I provide clutch means shiftable to lock the desired driving pinion to the intermediate drive shaft, the pinions being at all times in mesh with the gears driven thereby. The stresses to which such gears have heretofore been subjected in shifting them into and out of driving engagement is thereby eliminated as is the undesirable shifting of the intermediate drive shaft.

A further aim of my invention is the provision of a tractor which while adapted for general agricultural purposes is particularly adapted for use in the cultivation of growing crops such as corn, which is grown in rows and has to be cultivated upon reaching quite a height. To this end, the chassis frame proper of the tractor is arranged to pass between the rows of crops, that is, in the aisles, while the rear wheels are arranged to track in the adjacent aisles suitable clearings being provided for straddling the rows of growing crops without injuring the same.

Further aims of my invention and various novel constructional details and arrangements of the various mechanisms form the subject matter of certain of the appended claims and will be set out in detail in the following description.

I shall now describe my invention further with reference to the accompanying drawings, in which—

As in my co-pending applications, the present tractor is driven and steered by a pair of combined driving and steering wheels 5—5 keyed, splined or otherwise suitably fixed upon the opposite ends respectively of the front axle 7 of the vehicle. The opposite ends of the axle 7 are tapered to receive the wheels 5—5 and provided with axially projecting threaded studs for the reception of suitable nuts 8 by means of which nuts and the co-operating washers 9 the wheels 5—5 are locked against axial displacement. The axle 7 is rotatably mounted between the wheels 5—5 in a yoke member 10 which yoke member 10 is mounted upon a vertical axis for complete rotation with respect to the running gear or chassis of the tractor.

The yoke member 10 includes a downwardly extending yoke portion 11 and an upright hollow spindle or standard 12. The yoke portion 11 is split through the bearings providing a lower half which lower half includes bearing caps 13 and the lower half 14 of the main driving gear case the upper half of which gear case is included in the main yoke portion 11. A main driving gear 15 is keyed or otherwise suitably fixed upon the front axle 7 adjacent one of the depending portions of the yoke member 10. A spacer 17 separates the opposite end of the gear and the adjacent depending portion of the yoke member 10. The thrust of the gear 15 is taken up by a suitable thrust washer 16. Suitable bearing sleeves 18 are fitted upon the axle 7 adjacent the outer faces of the washer 16 and the front axle with the wheels 5, main driving gear 15, bearing sleeves 18, thrust washer 16 and spacer 17 thus assembled are arranged in the front yoke member 10 and the lower half 14 of the gear case and bearings 13 are then bolted in place as by means of suitable bolts 19.

The main driving pinion 20 is fixed upon the lower end of the vertical driving shaft 21 and is secured against axial displacement by means of a washer 22, nut 23 and cotter pin 24. The thrust of the driving pinion 20 is taken up by a thrust washer 25 backed by a steel washer 26. A radial bushing or sleeve 27 embraces the lower end of the vertical drive shaft 21 while a similar bushing or sleeve 28 embraces the upper end thereof. The high and low speed driving gears 29 and 30 respectively, are fixed upon the upper end of the vertical drive shaft 21 which shaft is rotatably mounted in the yoke member 10 as has been described. The thrust of these gears 29 and 30 which gears are further secured together by lock screws 31 is taken up by a ball thrust collar 32. A nut 34 and co-operating washer are provided at the upper end of the vertical shaft 21 in order to hold the main driving pinion 20 in place in order that it will not slip down and wedge or jam the teeth of the co-operating gear 15 when these gears are in motion.

The intermediate driving shaft 35 which is driven from the engine through a chain and co-operating bracket, is provided with a low and high speed driving pinion 36 and 37 respectively, sleeved or loosely mounted thereupon. More specifically, these pinions 36 and 37 are keyed to steel bushings 38 which revolve about bronze bearings 39. In that the driving pinions 36 and 37 are at all times in mesh with the driving gears 29 and 30 they must be and are normally free to turn or rotate therewith. They are not keyed directly to the shaft 35 except when the clutch 40 which is splined upon the shaft 35 is shifted therealong to engage the teeth provided in one end thereof with the co-operating teeth provided in the adjacent end of the bushing carrying the pinion 36 or in the opposite direction to engage the teeth provided in the opposite end of the sleeve 40 with the co-operating teeth provided in the adjacent end of the bushing carrying the pinion 37. In this manner the clutch is shifted along the shaft 35 into engagement with either the pinion 36 or the opposite pinion 37 and a corresponding gear ratio of low or high speed is obtained.

The shifting of the clutch 40 along the shaft 35 is accomplished by a shifting fork 42 which fork is fixed upon a shifting shaft 43. The rear end of the shaft 43 is pivotally connected with a link 44 the opposite end of which link is in turn pivotally connected with a pivoted arm 45. The arm 45 is connected thru a rod 46 with the manual shifting lever 47 arranged just forward of the steering wheel of the vehicle and for convenient access from the driver's seat. The lower edge of the lever arm 47 is provided with three distinct notches 48 corresponding to high, neutral and low speed position of the clutch sleeve 40. These notches 48 are adapted to engage the shank of a bolt 49 mounted in a bracket member 50 which bracket member 50 is bolted or otherwise secured to the upright steering wheel supporting brackets or brace 51. A tension spring 52 attached at one end to the lever 47 and at its opposite end to the bracket member or brace 51 maintains engagement of the particular notch 48 properly positioned and the bolt 49.

The front yoke member 10 is revolvably mounted thru the upright spindle or standard 12 thereof in a pair of suitable bearings 53—53 forced into the bearing head 54 provided at the forward end of the arched main frame section 55 of the vehicle. The worm steering gear 56 mounted upon the spindle 12 just below the bearing head 54 is provided with a web portion 57 which web portion engages an annular shoulder 58 formed integral with the spindle 12. Set screws mounted in the annular shoulder or flange 58 are provided with heads which engage or are received in suitable apertures provided about the web portion 57 of the worm gear 56, fixing the gear to the yoke to prevent relative rotation therebetween. A suitable ball thrust collar 59 is fitted between the worm gear 56 and the lower edge of the bearing head 54. A plurality of set screws or pins are employed between the gear 56 and flange 58, (six in this particular instance) thereby allowing various adjustments of the gear 56 about the spindle, one position of the gear being provided for each of such set screws employed in order that the gear may be adjusted to distribute the wear thereabout.

The intermediate driving shaft 35 is supported by outer intermediate and after bearings 60, 61 and 62, carried by the main frame section 55. These bearings are preferably bushed with suitable bronze bushings as shown. The change speed gearing is incased in a substantially dust and oil tight casing 63 carried by the bearing head 54 of the arched frame section 55. A gear case cover 64 covers the entire gears, clutch sleeve 40 and associated parts and supports the forward end of the clutch shifting shaft 43. This upper gear case is preferably filled with heavy oil as is also the lower gear case enclosing the main driving gear and pinions. A suitable compression grease cup may be provided for use in lubricating the front axle bearings and the upper and lower bearings of the vertical drive shaft as well as the steering worm gear.

The intermediate driving shaft 35 is securely fixed against axial rearward movement by means of a collar 66 fixed thereupon, which collar 66 abuts against the forward face of the bearing member 62. A driven sprocket 68 is keyed upon the rear end of the shaft 35 and secured against axial displacement by means of a nut 69 and co-operating washer. At the lower end of the main frame section 55 is disposed the main bearing 70 for the forward end of the engine clutch shaft 71. Upon this clutch shaft 71 is secured the main driving chain sprocket 72 and at a short distance up an idler sprocket 73 is mounted upon a spindle, which spindle is in turn mounted in a bearing 74 likewise carried by the frame section 55. The main bearing for the forward end of the engine clutch shaft 71 may comprise either roller or ball bearings as shown, the outer end being adapted to receive the main driving pulley as fully set out in my co-pending application, Serial No. 374,544, filed April 17, 1920. A driving chain 75 trained over the driven sprocket 68 and driving sprocket 72 effects a driving connection between the engine clutch shaft 71 and the intermediate driving shaft 35 when the clutch 76 is in. A sheet metal casing 78 encloses the sprockets 68 and 72 and driving chain 75.

Figure 1:
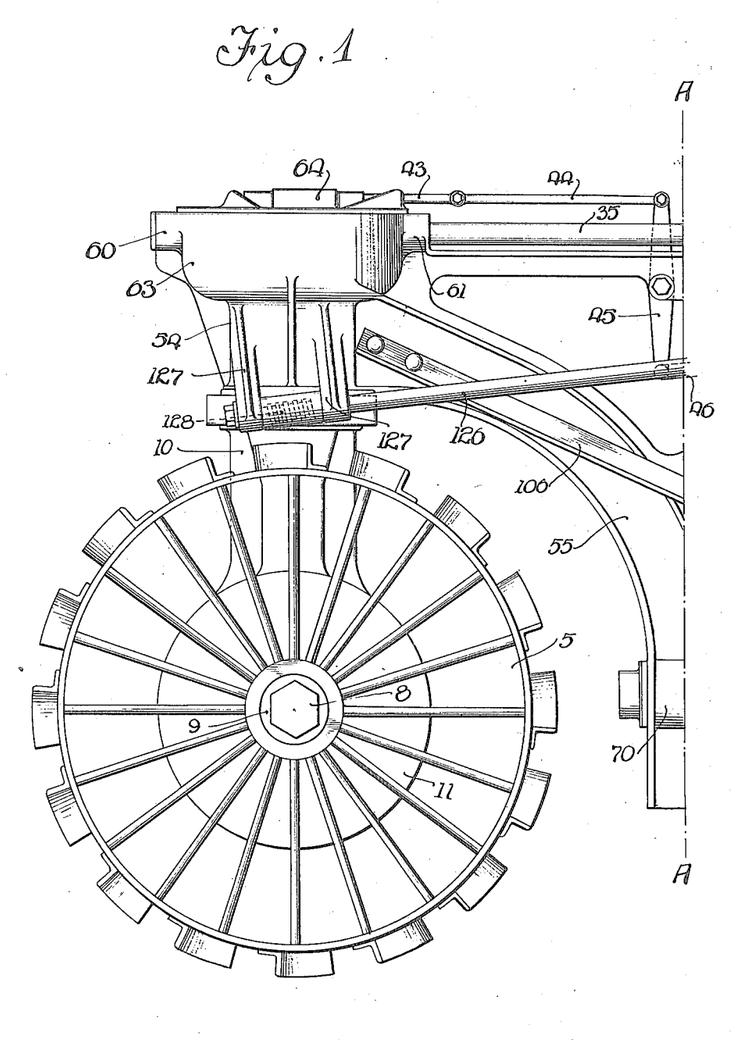
Figure 1 is a side elevational view of the forward portion of the tractor embodying the features of the present invention, Figure 1$^A$ is a side elevational view of the intermediate portion of the tractor, Figure 1$^B$ is a side elevational view of the rear or after portion of the same (a complete side elevation of the tractor is had by arranging Figure 1$^A$ to the right of Figure 1 with the line *b—b* thereof coincident with the line *a—a* of Figure 1, and Figure 1$^B$ to the right of Figure 1$^A$ with the line *c—c* thereof coincident with the line *d—d* of Figure 1$^A$.)
Figure 1A:
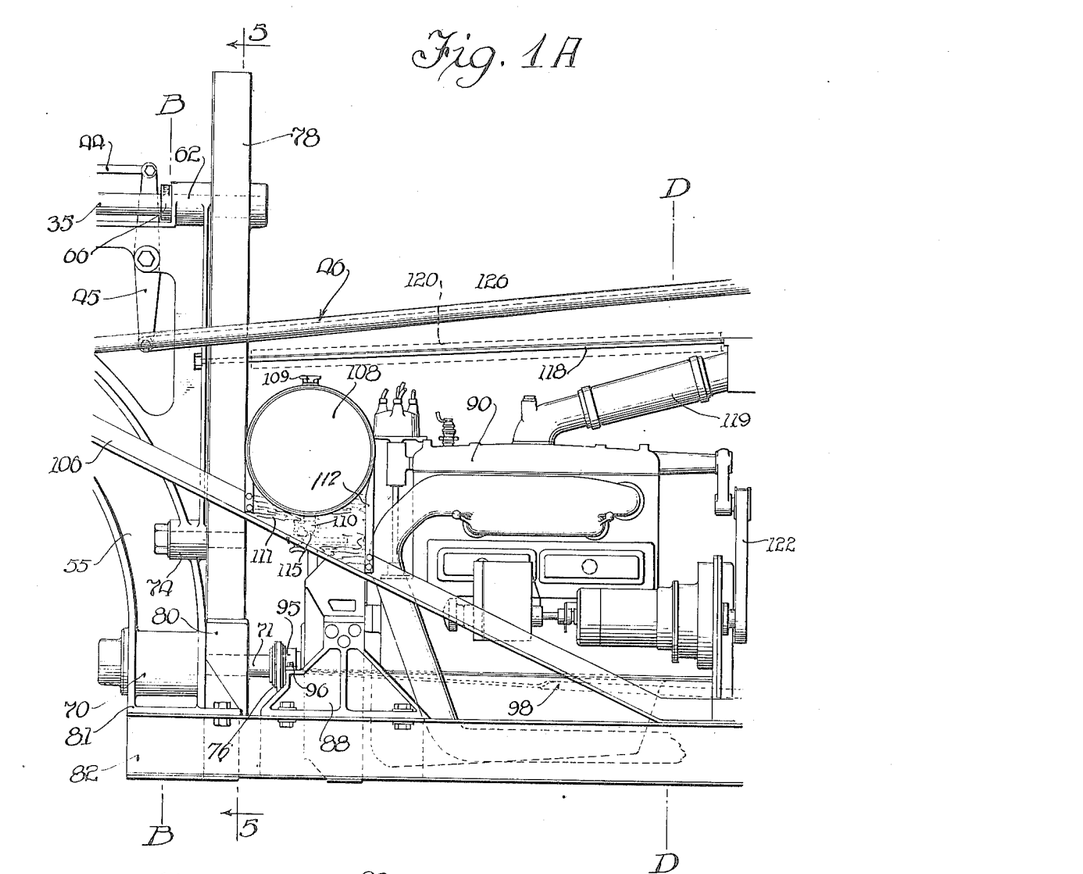
Figure 2:
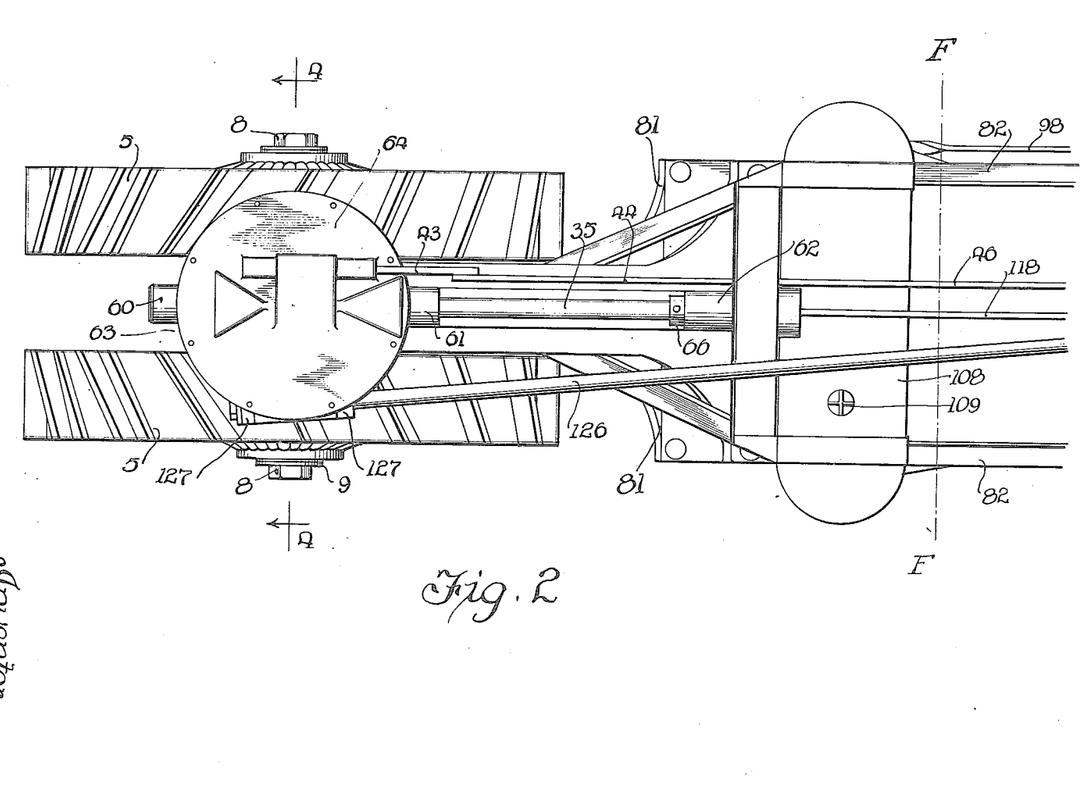
Figure 2 is a plan view of the forward portion of the tractor, Figure 2$^A$ is a plan view of the rear or after portion of the same (a complete plan view of the tractor is had by arranging Figure 2$^A$ to the right of Figure 2 with the line *e—e* thereof coincident with the line *f—f* of Figure 2.)
Figure 5:
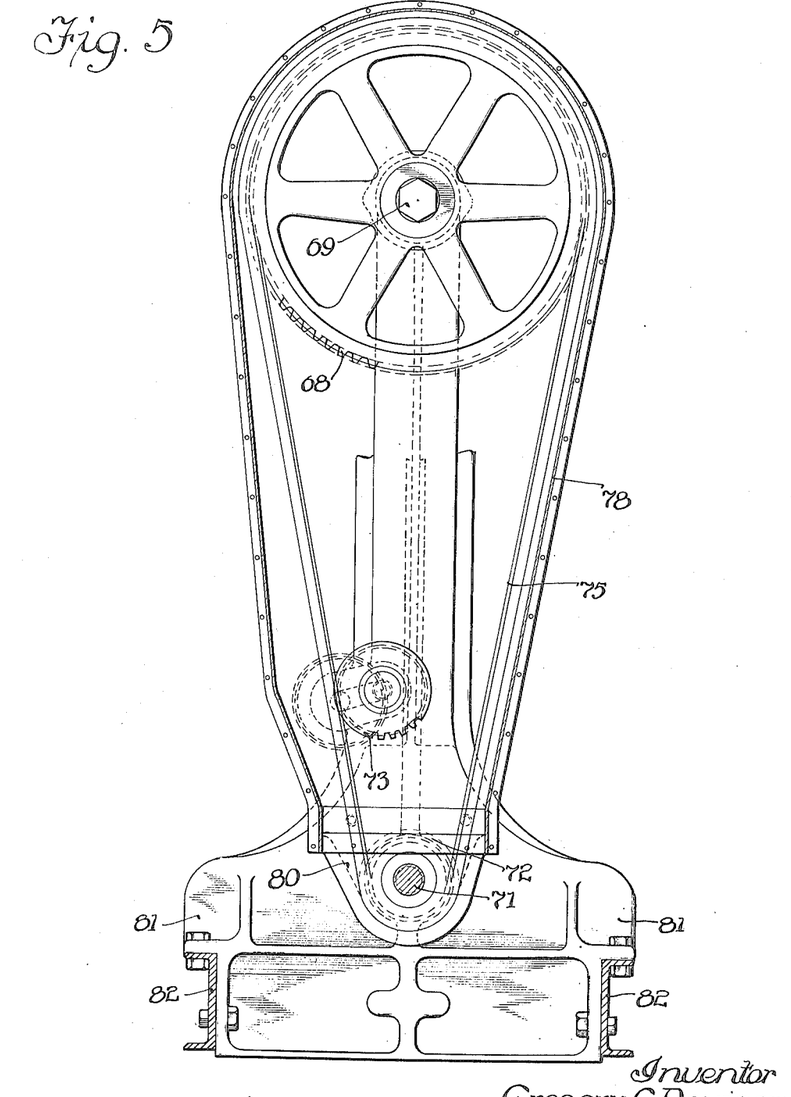
Figure 5 is an enlarged vertical transverse sectional view taken substantially on the line 5—5 of Figure 1$^A$.
Figures 6, 7:
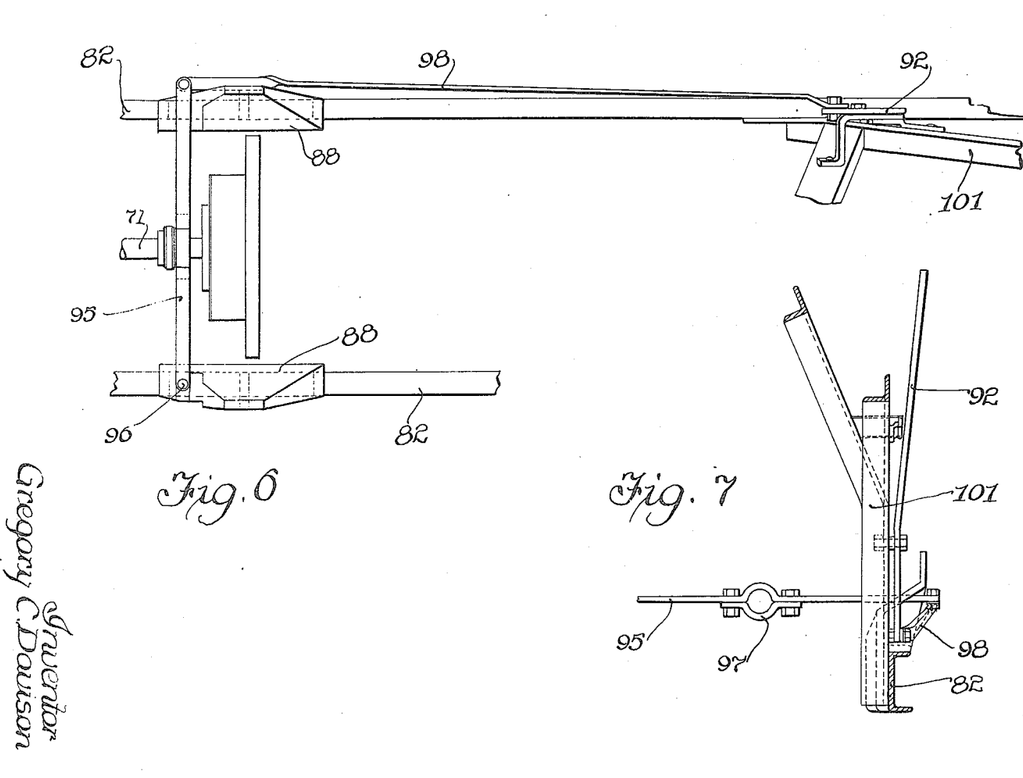
Figure 6 is a comprehensive plan view showing the arrangement of the clutch shifting mechanism.
Figure 7 is a rear elevational view of the clutch shifting mechanism.
Figure 8:
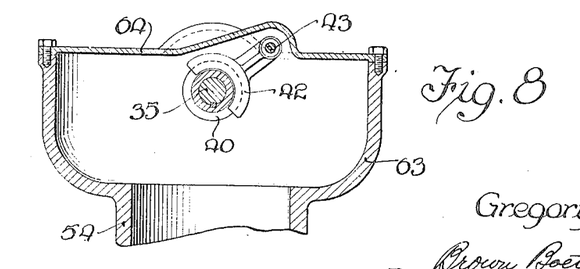
Figure 8 is a fragmentary cross-sectional view taken substantially on the line 8—8 of Figure 4.

A pocket is cast or cored in the lower rearwardly projecting portion 80 of the main frame section 55. The main driving sprocket 72 revolves in this pocket. A supply of lubricating oil or grease is maintained in the pocket to insure constant lubrication of the driving chain as well as the co-operating sprockets. The lower portion of the arched frame section 55 flares or flanges out athwartship as shown at 81 in Figures 1A, 2 and 5, to receive the longitudinal sill members or side rails 82 of the chassis frame.

The two longitudinal sill or side frame members 82 of the chassis are directly connected at their forward ends to the flanged portion of the main frame 55. Two cross braces 85 and 86 span the frame members 82 and are connected at their opposite ends thereto as by means of suitable gusset plates and rivets. Across the rear end of the chassis frame a relatively wide plate 87 is riveted. Directly to the rear of the main frame 55 are located two bracket members 88 which support the fly-wheel end of a 4-cylinder water cooled engine 90. The opposite end of the engine 90 is supported by a single bracket member 91 mounted upon the cross chassis frame 85.

The fly-wheel end of the engine is fitted with a clutch of any usual or preferred type operated by a hand lever 92 arranged to the right of the driver's seat for convenient access therefrom. The arrangement of the clutch shifting details are shown in Figures 1A, 1B, 6 and 7. The transversely arranged strap 95 is pivoted on the engine bracket 88 mounted upon the left hand longitudinal frame member 82 of the tractor by means of a stud 96. The strap 95 is connected with the clutch intermediate its length through the arched portion and co-operating clamping member 97 bolted thereto. The opposite end of the strap 95 is pivotally connected with a longitudinal connecting link 98 the opposite end of which link 98 is in turn pivotally connected with the lower end of the clutch shifting lever 92.

The lever 92 is pivoted within its length as at 100 to the upright draw-bar brace 101. In order that the clutch may be held out as desired, a bar 102, (Figure 1B) is provided with a hooked portion into engagement with which the clutch shifting lever 92 is arranged upon swinging the same to the rear to disengage the clutch.

A pair of longitudinal side braces 106 and 107 preferably of standard angle steel are secured at their forward ends as thru suitable bolts or otherwise to the main frame section 55 adjacent the bearing head 54 thereof. The rear downwardly diverting ends of these longitudinal side braces are secured as thru suitable bolts, rivets or the like to the longitudinal side rails 82—82 of the main chassis frame thereby effectively tying the chassis frame to the forward ends of the arched main frame section 55. The gasoline tank 108 provided with a suitable filling plug 109 and shut-off cock 110 is supported in a transverse position in a supporting cradle comprising braces 111 which cradle is in turn mounted thru the straps 112 in an upright position upon the longitudinally extending side braces 106—107 of the vehicle. From the lower end of the gasoline tank 108 extends the usual supply tubing 115 to the carbureter (not shown) from which a combustible mixture is supplied to the engine 90 in the usual or any preferred manner.

To the rear of the engine 90 is located a radiator 116 of the usual or any preferred construction provided with a filler cap 117. The upper end or top of the radiator 116, the bottom of which radiator is attached through suitable studs and springs to each of the side frame members 82—82 respectively, of the chassis is braced by a truss rod 118. Communication between the radiator 116 and the engine 90 is had by suitable conduits 119. A suitable cooling fan 121 arranged just forward of the radiator 116 is driven for example through a belt 122. A water-proof cover 120 such as canvas or the like is preferably provided for the engine. This cover 120 is attached to the truss rod 118, and when in place is adapted to extend down to the chassis frame of the vehicle and be strapped thereto. When the cover 120 is not in use or when the tractor is working, this cover can be rolled up on either side and strapped in a roll around the truss rod 118. The engine 90 is provided with a starting crank 123 mounted upon the shaft 124 supported at its rear end in a bearing bracket 125 carried by the chassis frame.

Figure 1B:
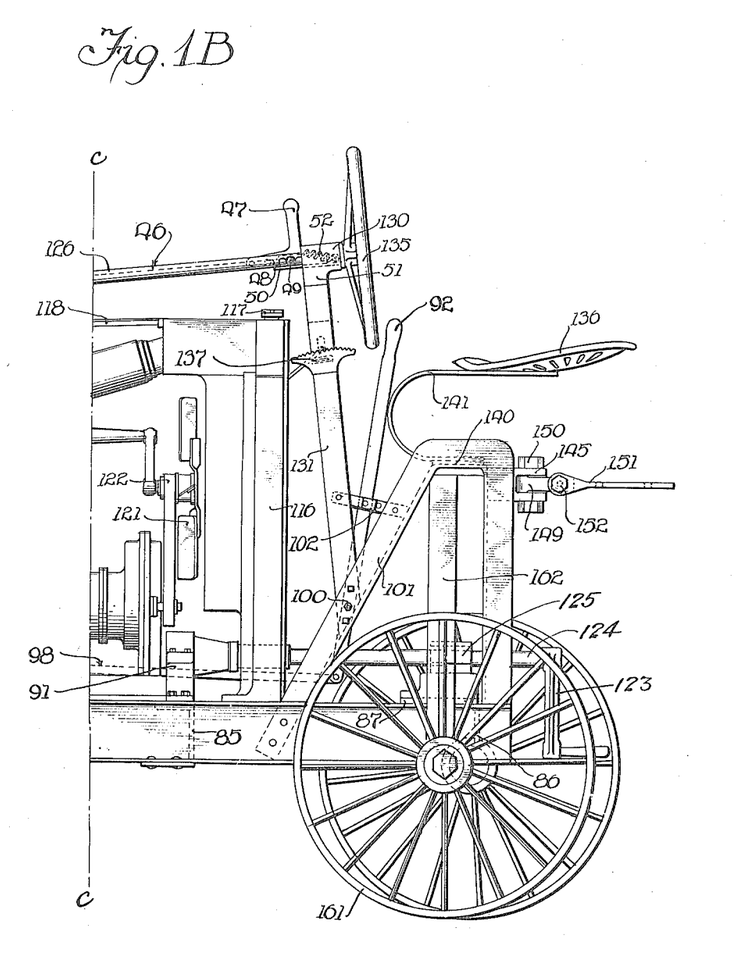

The forward end of the steering shaft 126 is supported in a pair of bracing arms 127—127 preferably formed integral with and projecting from the bearing head 54 of the main frame section 55. A steering worm 128 attached adjacent the forward end of the shaft 126 engages or meshes with the steering worm gear 56. The opposite or rear end of the steering shaft 126 bears in a supporting bearing bracket 130 carried through a pair of side legs or braces 131—131 by the draw bar bracing member 101—101. The upper ends of the side legs 131—131 are bolted or otherwise suitably secured to the bracket member 130 while the lower ends are secured to the draw bar frames. A steering hand wheel 135 is fixed upon the steering shaft 126 for convenient access from the driver's seat 136. Throttle connections 137 to the carbureter and adjusting means for the same are arranged for convenient access from the driver's seat 136, as shown in Figure 1ᴮ. Adjacent the rear of the tractor a pair of upright braces 101—101 are mounted upon the longitudinal sill members or side rails 82—82. A tie-brace 140 arranged transversly between the upright braces 101—101 braces the upper portion of these bracing members and in addition carries a seat spring 141 upon the upper free end of which the driver's seat 136 is mounted.

A universal hitch provided at the rear of the tractor comprises generally a yoke member 145 adjustably bolted to a draw-bar plate 146. The plate 146 is provided with horizontally aligned apertures 147 in order to provide lateral adjustment for the yoke member 145 therealong. Vertical aligned apertures 148 provided in the drawbar braces 101—101 permit the plate 146 to be raised or lowered and bolted in any desired vertical position depending upon the apertures 148 as selected. A coupling link 149 pivotally mounted in the yoke member 145 upon a vertical pin 150 is in turn pivotally connected at its opposite end with a draft link 151 through a horizontal pin 152. The trailer or draw load is adapted to be attached or connected with the draft link 151. This draw bar arrangement, the adjustability and other advantageous features thereof are more fully disclosed in co-pending application, Serial No. 398,950, filed July 26, 1920, in the name of myself and Cecil P. Caulkins, of which application the same forms the subject matter.

Figure 3:
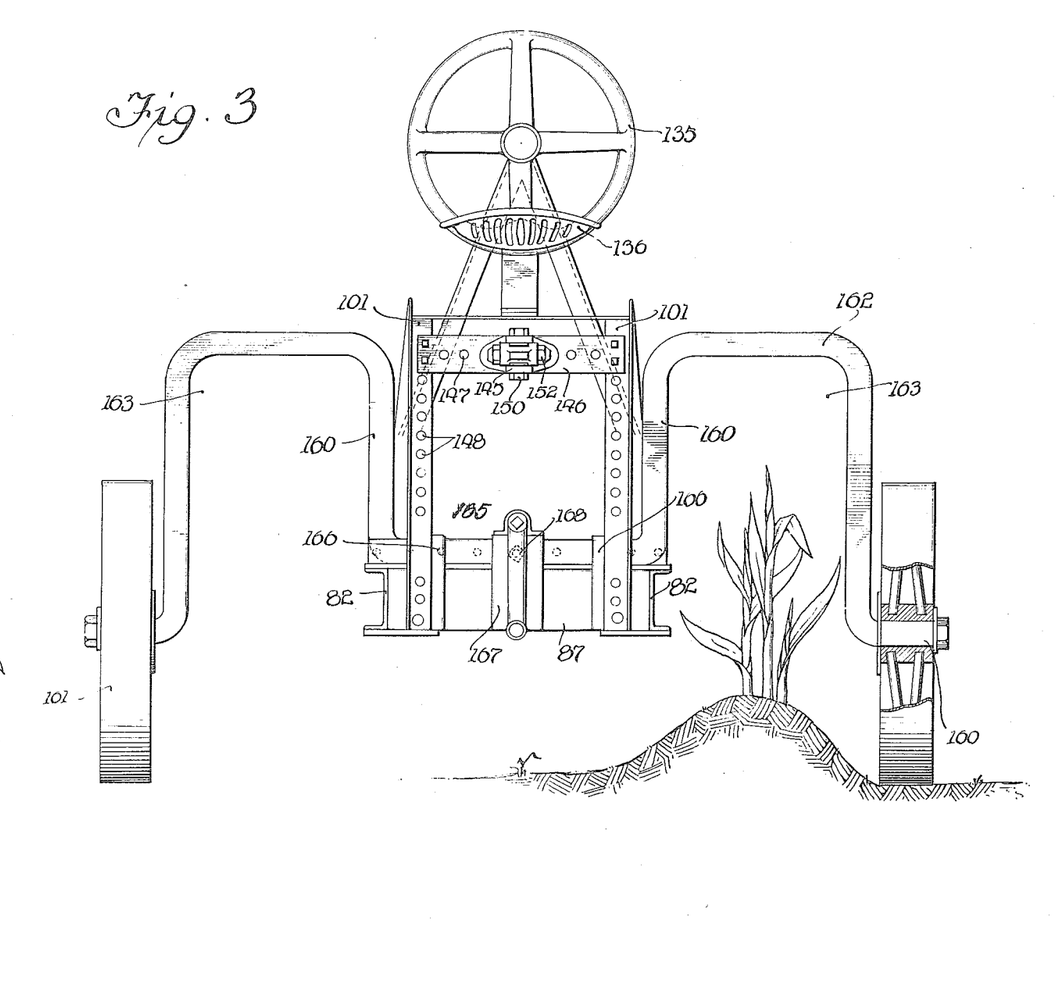
Figure 3 is a rear elevational view of the tractor.
Figure 4:
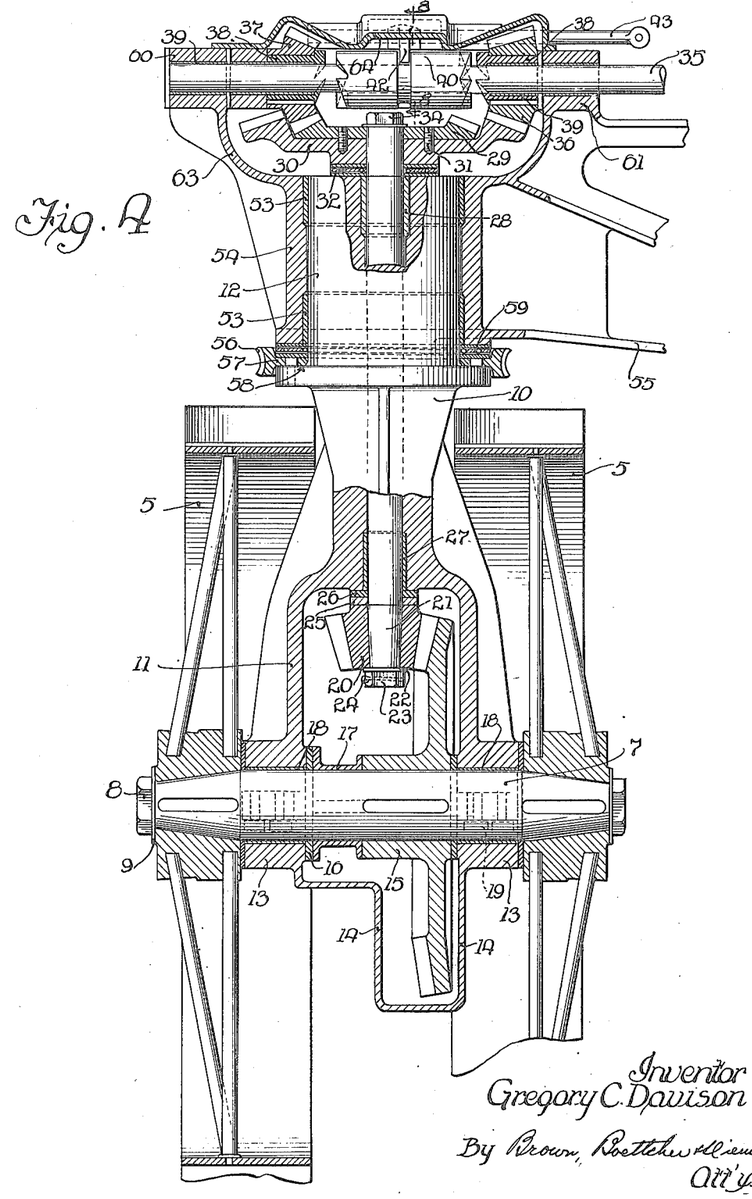
Figure 4 is an enlarged vertical transverse sectional view taken substantially on the line 4—4 of Figure 2.
Figure 4A:
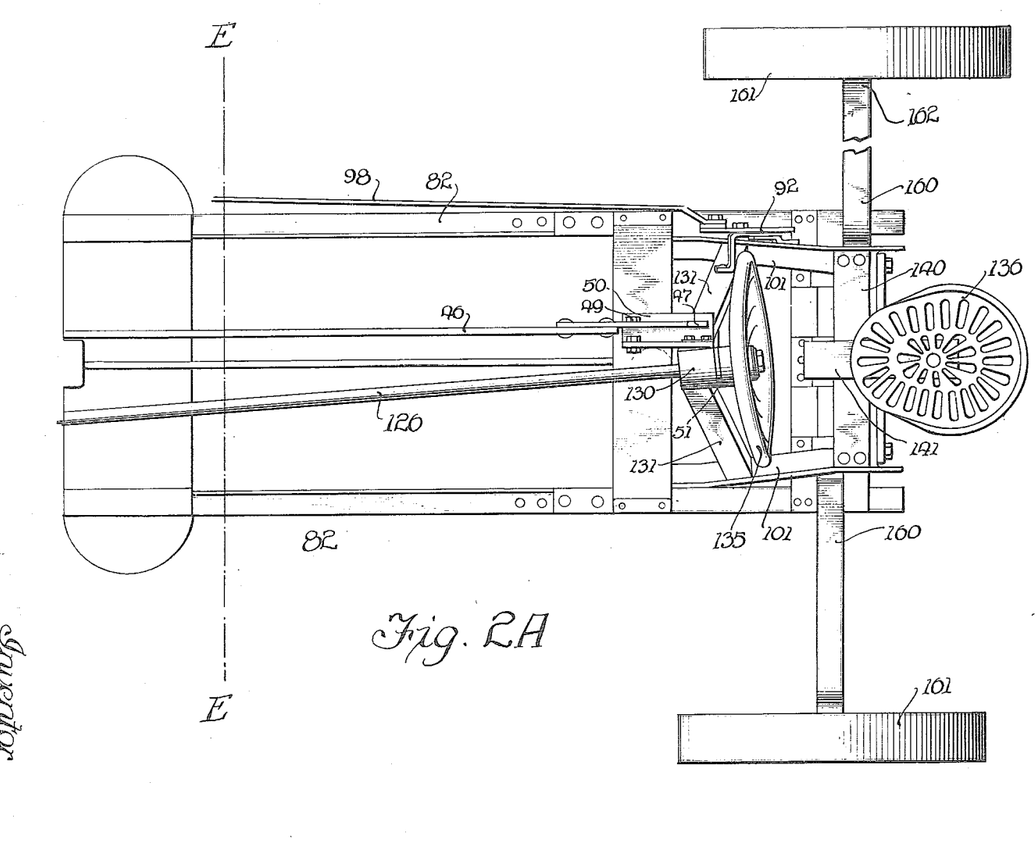

The rear axle of the vehicle comprises two similar axle sections 160—160 preferably though not necessarily made of square steel bars. The outer end of each axle section 160 is turned down to receive a wheel 161 and the usual washers, retaining nuts, etc. Lubrication may be had through suitable grease cups (not shown). Between the wheels 161—161 and the chassis frame of the vehicle, the axle sections 160—160 are looped as shown at 162 to provide suitable clearings 163. The main driving wheels 5—5 and chassis frame of the tractor are arranged to pass between the rows of crops or in the aisles as shown in Fig. 3. The rear wheels 161—161 are arranged to track in the adjacent aisles allowing for proper cultivation of the crops without damage thereto.

The opposite horizontally extending portions 165 of the axle sections 160 are supported by three bearings, two outer bearings 166 secured to the chassis frame and a center bearing 167 mounted intermediate the width of the rear end of the chassis frame. A bolt 168 extends through the center bearing 167 and is provided with a suitable nut. Horizontally aligned apertures drilled in the adjacent inner ends of the axle sections 160 are adapted to register at various widths of the tread whereby the sections may be adjusted and locked in adjusted position by means of the bolt 168. Either one or both wheels 161 may be thereby adjusted laterally. In using a single row cultivator the cultivator pole or draw bar may be directly attached to the center of one of the looped portions 162 of the axle section, thereby providing a side hitch to the tractor whereby single rows of crops may be perfectly cultivated. In the position shown, the wheels 161—161 are at their minimum tread. Upon encountering various widths of crops either or both of these wheels may be adjusted outward by removing the bolt 168 making the proper adjustment and again inserting the bolt to maintain such adjustment. Thus the tread of the wheels 161 may be adjusted so that the axles 160 will clear the crops irrespective of the width of the rows. In operation steering of the vehicle is had by rotation of the driving wheels 5—5 through the steering shaft 126 about the axis of the vertical spindle 12. High speed in one direction is had when the driving pinion 37 is keyed to the intermediate shaft 35, while the high speed in the opposite direction is attained by rotating the front axle yoke 10 either to the right or to the left as is most convenient to the operator through one-half a revolution or 180 degrees. Low speed in one direction is had when the driving pinion 36 is keyed to the shaft 35, while low speed in the opposite direction is had by rotating the yoke 10 about the axis of the spindle 12 through 180 degrees.

I claim:

1. In a vehicle of the class described, the combination of a frame, a drive wheel, a driven shaft having driving connection with said drive wheel, a pair of driven members on said shaft, a drive shaft, a pair of drive members loosely mounted on said drive shaft and having driving engagement with said driven members to drive said members in opposite directions and at different speeds, said wheel being adapted for complete lateral rotation to reverse the direction of movement of the vehicle, and a common device for changing the speed of the forward and reverse movement of the vehicle, said device comprising a clutch sleeve splined upon the drive shaft and shiftable into driving engagement with said drive members.

2. In a vehicle of the class described, the combination of a main frame, a wheel frame having a drive wheel associated therewith, said wheel frame being rotatable through 180° to turn the drive wheel around and reverse the direction of movement of the vehicle, a vertical shaft mounted in said wheel frame and having driving connection with the drive wheel, a pair of driven members at the upper end of said vertical shaft, a drive shaft, a pair of drive members loosely mounted upon said drive shaft and having driving engagement with opposite sides of said driven members to drive said members in opposite directions and at different speeds, and a common device for changing the speed of the forward and reverse movement of the vehicle, said device comprising a clutch sleeve splined upon the drive shaft and shiftable into driving engagement with said drive member.

3. In a vehicle of the class described, the combination of a main frame, a wheel frame, a wheel carrying member revolvably journaled in said wheel frame, a drive wheel carried by said member, said wheel being adapted for complete lateral rotation to reverse the direction of movement of the vehicle, a relatively large gear connected to said drive wheel, a vertical shaft mounted in the wheel carrying member and having a relatively small pinion on its lower end in driving engagement with said relatively large gear, a pair of bevel gears concentrically arranged upon the upper end of said vertical shaft, a second shaft arranged substantially normal to said first shaft and having a pair of bevel gears loosely mounted thereupon, said last named gears having driving engagement with opposite sides of said first gears to drive the vertical shaft in opposite directions and at different speeds, and a common device for changing the speed of the forward and reverse movement of the vehicle, said device comprising means shiftable along the drive shaft into driving engagement with the respective bevel gears thereon.

4. In a vehicle of the class described, a frame, a wheel carrying member rotatably journaled therein, a wheel carried by said member, said wheel being adapted for complete lateral rotation to reverse the direction of movement of the vehicle, a vertical shaft mounted in said member and having driving connection with the wheel, a pair of drive members at the upper end of the vertical shaft, a driven member on said vertical shaft in constant driving engagement with one of said drive members to be driven thereby, a second driven member on said shaft and in constant driving engagement with the other of said drive members to be driven in the opposite direction thereby, and means common to both said drive members for establishing the drive to said vertical shaft through either of said members.

5. In a vehicle of the class described, a frame, a wheel carrying member rotatably journaled therein, a wheel carried by said member, said wheel being adapted for complete lateral rotation to reverse the direction of movement of the vehicle, a vertical shaft mounted on said member and having driving connection with the wheel, a substantially horizontal intermediate shaft, a pair of drive members on said intermediate shaft, a driven member on said vertical shaft for driving engagement with one of said drive members, a second driven member on said shaft for driving engagement with the other of said drive members to be driven thereby in the opposite direction, means common to both said drive members for establishing the drive to said vertical shaft through either of said drive members, a substantially horizontal engine shaft, a driven sprocket on the horizontal intermediate shaft, a driving sprocket on the engine shaft, and a driving chain trained over said driving and driven sprockets to transmit the driving effort of the engine shaft to the intermediate shaft.

6. In a vehicle of the class described, a frame, a wheel carrying member rotatably journaled therein, a wheel carried by said member, said wheel being adapted for complete lateral rotation to reverse the direction of movement of the vehicle, a vertical shaft mounted in said member and having driving connection with the wheel, a substantially horizontal intermediate shaft, a pair of drive members on said intermediate shaft, a pair of driven members on the vertical shaft to engage and be driven by said drive members in opposite directions and at different speeds, means common to both of said drive members for transmitting the drive to the vertical shaft through either of said members, a substantially horizontal engine shaft, a driven sprocket on the horizontal intermediate shaft, a driving sprocket on the engine shaft, and a driving chain trained over said driving and driven sprockets to transmit the driving effort of the engine shaft through the intermediate shaft.

7. In combination, a vehicle frame, a wheel carrying frame journaled for rotation, a wheel carried thereby, said wheel being adapted for complete lateral rotation to reverse the direction of movement of the vehicle, a drive shaft, a pair of bevel pinions on said shaft, a driven shaft journaled in the rotatable wheel carrying frame, a bevel gear on said shaft cooperable with one of said bevel pinions, a second bevel gear cooperable with the other bevel pinion on the opposite side of the axis of the driven shaft, a bevel pinion on the driven shaft, and a bevel gear connected with the wheel, cooperable with said bevel pinion and rotatable thereabout.

8. In combination, a vehicle frame, a wheel carrying frame journaled therein, a wheel carried thereby, a driven shaft journaled in the rotatable wheel carrying frame, a driving member on said shaft, a cooperable driven member connected with the wheel, means for driving the driven shaft in one direction, means for moving said driven member about said driving member to establish driving relation with said means in the opposite direction, means for driving the drive shaft at a different speed, the driving relation with said second means being reversed by movement of the driven member connected with the wheel about its cooperable drive member.

In witness whereof I hereunto subscribe my name this 15 day of July, 1920.

GREGORY C. DAVISON.